US012753641B2

(12) United States Patent
Jeong

(10) Patent No.: US 12,753,641 B2
(45) Date of Patent: Oct. 6, 2026

(54) PART UNIT AND STRUCTURE FOR ASSEMBLING VEHICLE BODY

(71) Applicant: WOOBO TECH CO., LTD., Pyeongtaek-si (KR)

(72) Inventor: Hae Il Jeong, Incheon (KR)

(73) Assignee: WOOBO TECH CO., LTD., Pyeongtaek-si (KR)

(*) Notice: Subject to any disclaimer, the term of this patent is extended or adjusted under 35 U.S.C. 154(b) by 518 days.

(21) Appl. No.: 18/554,875

(22) PCT Filed: May 19, 2023

(86) PCT No.: PCT/KR2023/006876
§ 371 (c)(1),
(2) Date: Oct. 11, 2023

(87) PCT Pub. No.: WO2024/117401
PCT Pub. Date: Jun. 6, 2024

(65) Prior Publication Data

US 2025/0084673 A1 Mar. 13, 2025

(30) Foreign Application Priority Data

Dec. 1, 2022 (KR) ........................ 10-2022-0165572

(51) Int. Cl.
*F16B 5/02* (2006.01)
*B60J 5/04* (2006.01)
(Continued)

(52) U.S. Cl.
CPC ............. *E05B 79/06* (2013.01); *B60J 5/0469* (2013.01); *B62D 65/06* (2013.01); *F16B 5/0233* (2013.01);
(Continued)

(58) Field of Classification Search
CPC .......... F16B 5/0233; F16B 5/10; F16B 21/04; F16B 21/02
(Continued)

(56) References Cited

U.S. PATENT DOCUMENTS 3,146,010 A * 8/1964 Dellith .................... F16B 21/02 248/27.1
5,267,820 A * 12/1993 Sturtevant ............... B60R 13/01 411/551
(Continued)

FOREIGN PATENT DOCUMENTS

JP 2012-149732 A 8/2012
JP 2021-156329 A 10/2021
(Continued)

OTHER PUBLICATIONS

Korean Intellectual Property Office, Notice of Allowance, Application No. 10-2022-0165572, dated Aug. 8, 2023, 6 pages (in Korean).
(Continued)

*Primary Examiner* — Flemming Saether
(74) *Attorney, Agent, or Firm* — Merchant & Gould P.C.

(57) ABSTRACT

The present disclosure relates to a part unit and a vehicle body assembly structure. More specifically, the present disclosure relates to a part unit and a vehicle body assembly structure in which assembly ability of a part to a vehicle body such as a curved surface is remarkably improved.

20 Claims, 14 Drawing Sheets

(51) Int. Cl.

| | |
|---|---|
| ***B62D 65/06*** | (2006.01) |
| ***E05B 79/06*** | (2014.01) |
| ***F16B 33/00*** | (2006.01) |
| ***F16B 37/04*** | (2006.01) |
| ***F16B 37/16*** | (2006.01) |

(52) U.S. Cl.

CPC .......... *F16B 33/002* (2013.01); *F16B 37/042* (2013.01); *F16B 37/16* (2013.01); *B60J 5/0413* (2013.01); *B60J 5/0415* (2013.01)

(58) Field of Classification Search

USPC .................................................. 411/550, 551

See application file for complete search history.

(56) References Cited

U.S. PATENT DOCUMENTS

| | | | | |
|---|---|---|---|---|
| 6,702,503 | B2 * | 3/2004 | Pinzl | F16B 5/0233 403/348 |
| 10,793,027 | B2 * | 10/2020 | Osterhoff | B60N 2/02 |
| 11,598,127 | B2 * | 3/2023 | Jeong | E05B 85/16 |
| 11,976,683 | B2 * | 5/2024 | Mücke | F16B 5/0233 |
| 12,196,240 | B2 * | 1/2025 | Frisch | F16B 5/0233 |
| 12,409,903 | B2 * | 9/2025 | Jeong | B62D 27/023 |
| 2006/0226312 | A1 * | 10/2006 | Masuch | F16B 37/041 248/188 |
| 2024/0044349 | A1 * | 2/2024 | Bente | F16B 5/025 |
| 2025/0052095 | A1 * | 2/2025 | Namannavar | E05B 79/06 |
| 2025/0243886 | A1 * | 7/2025 | Robertson | F16B 5/0628 |

FOREIGN PATENT DOCUMENTS

| | | | |
|---|---|---|---|
| KR | 10-2006-0105292 | A | 10/2006 |
| KR | 10-1216286 | B1 | 12/2012 |
| KR | 10-2419003 | B1 | 7/2022 |

OTHER PUBLICATIONS

International Searching Authority/KR; International Search Report and Written Opinion of the International Searching Authority, Application No. PCT/KR2023/006876, mailed Sep. 13, 2023, 6 pages.

* cited by examiner

[Fig. 1]
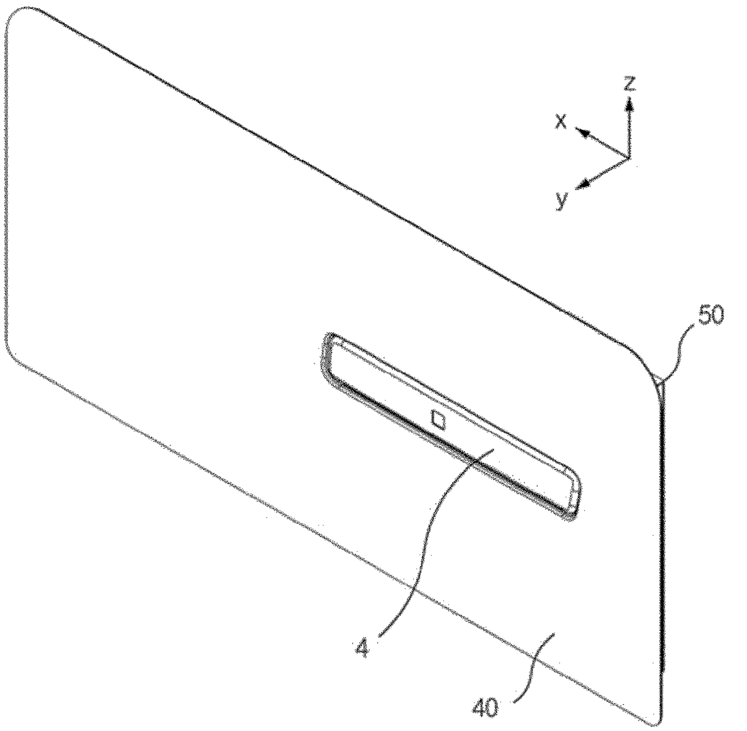
[Fig. 2]
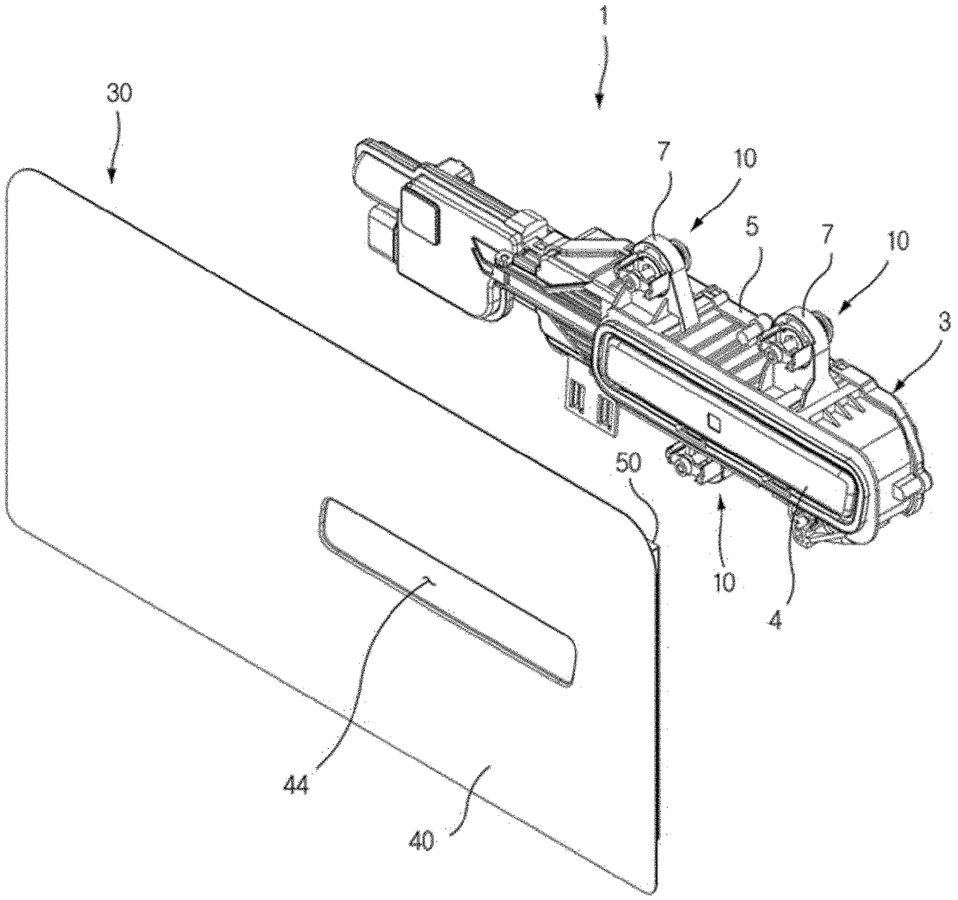

[Fig. 3]
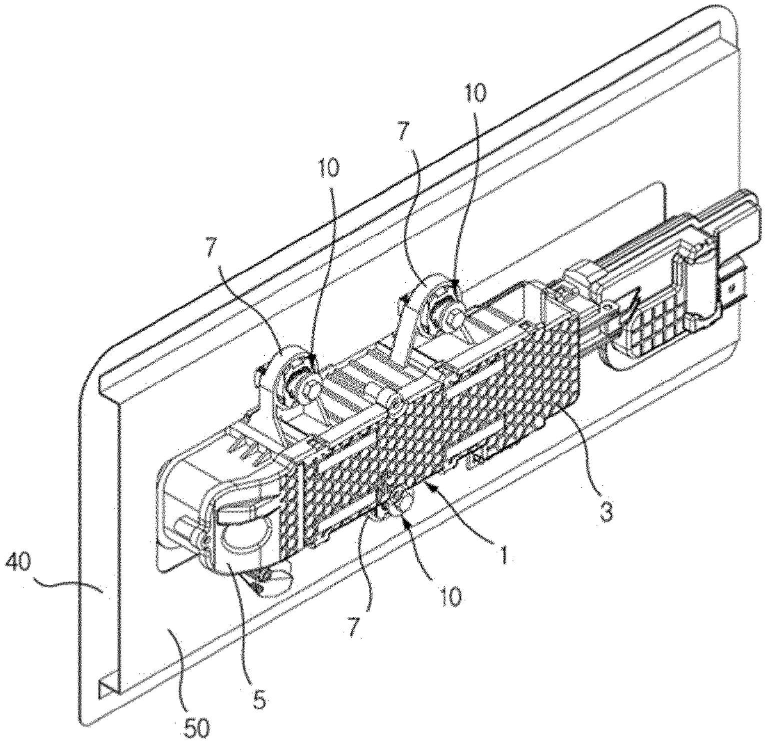
[Fig. 4]
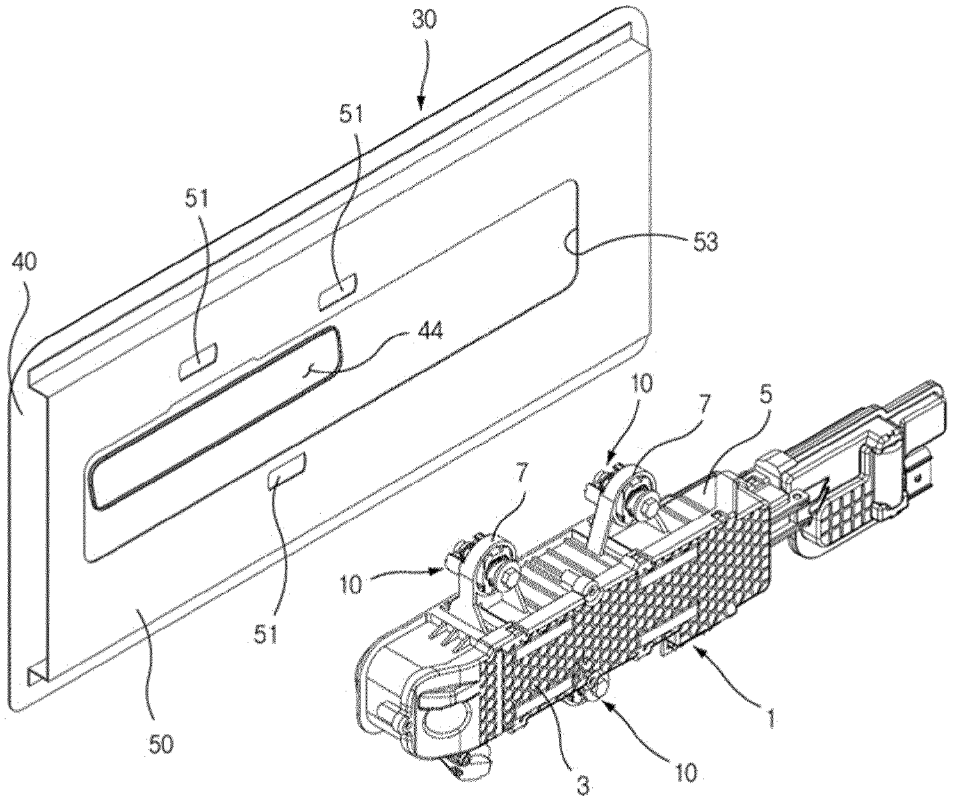

[Fig. 5]
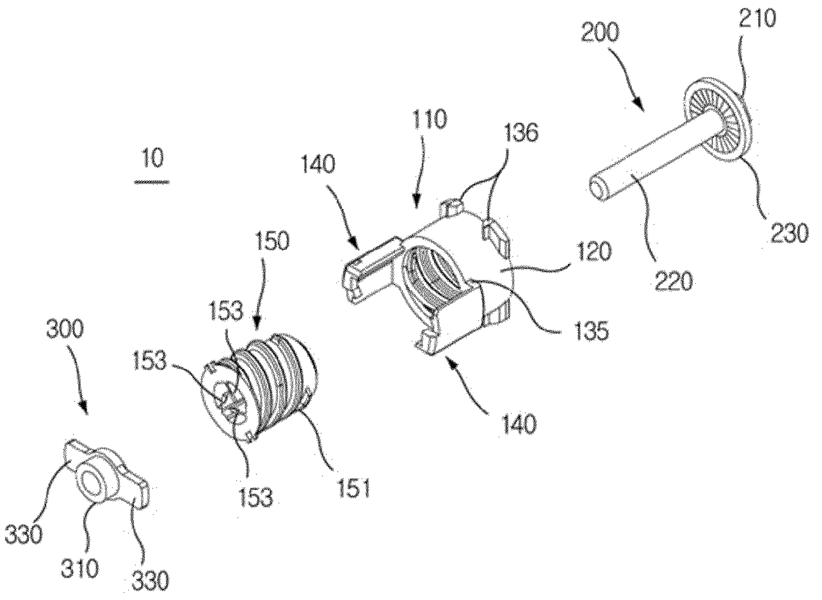
[Fig. 6]
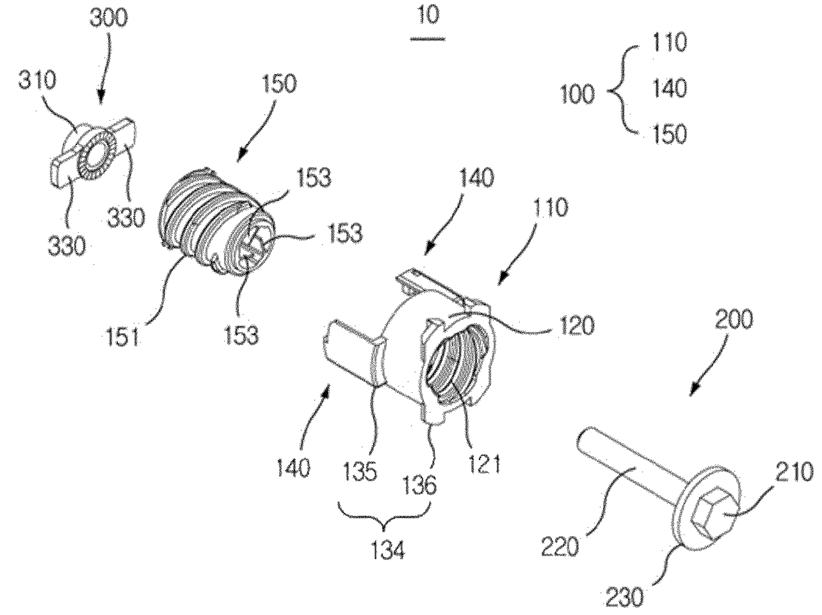

[Fig. 7]
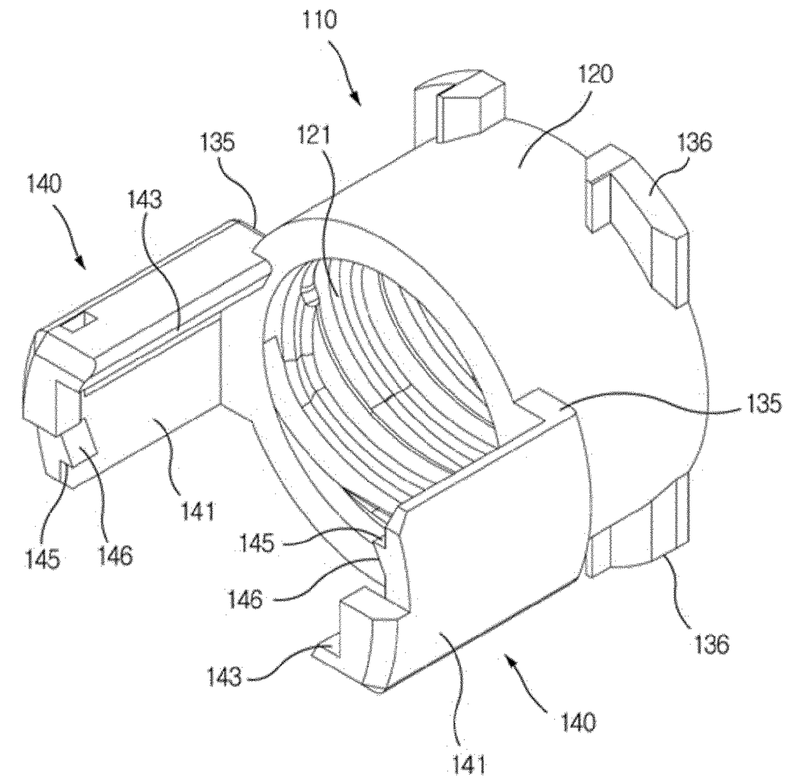
[Fig. 8]
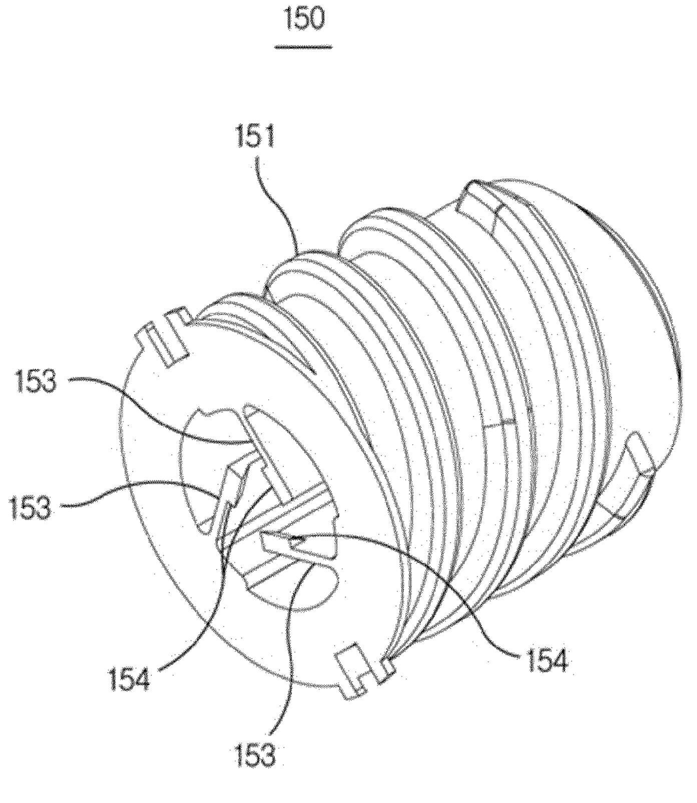

[Fig. 9]
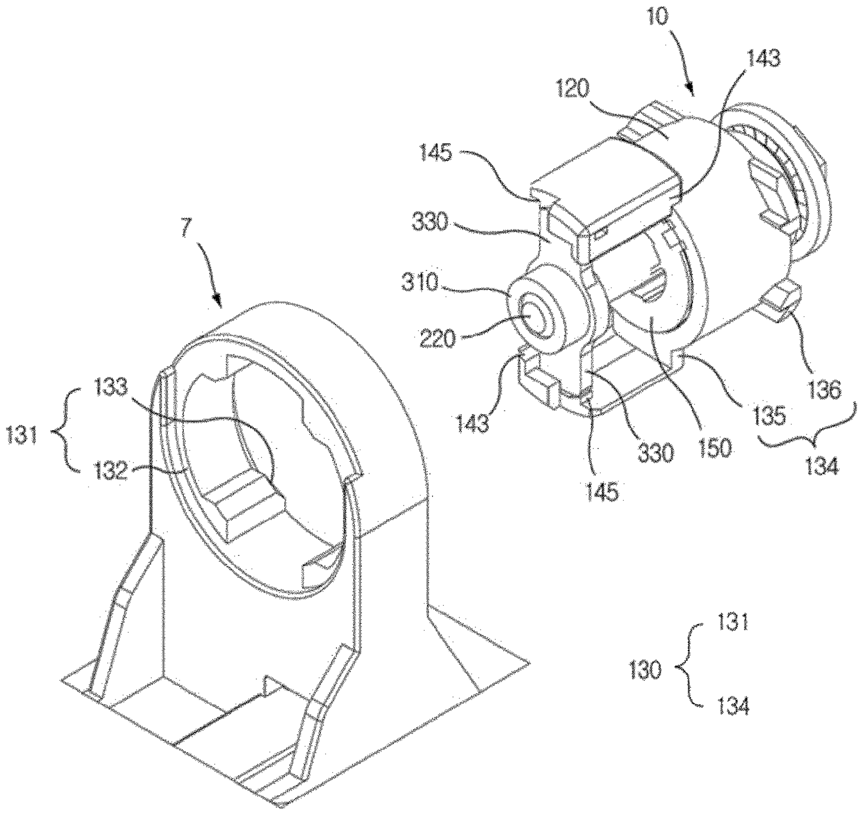
[Fig. 10]
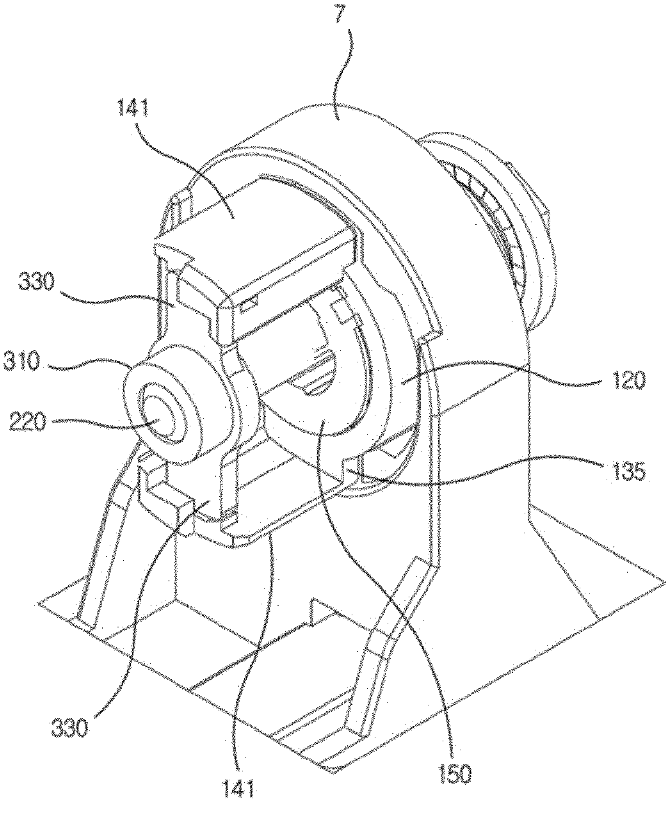

[Fig. 11]
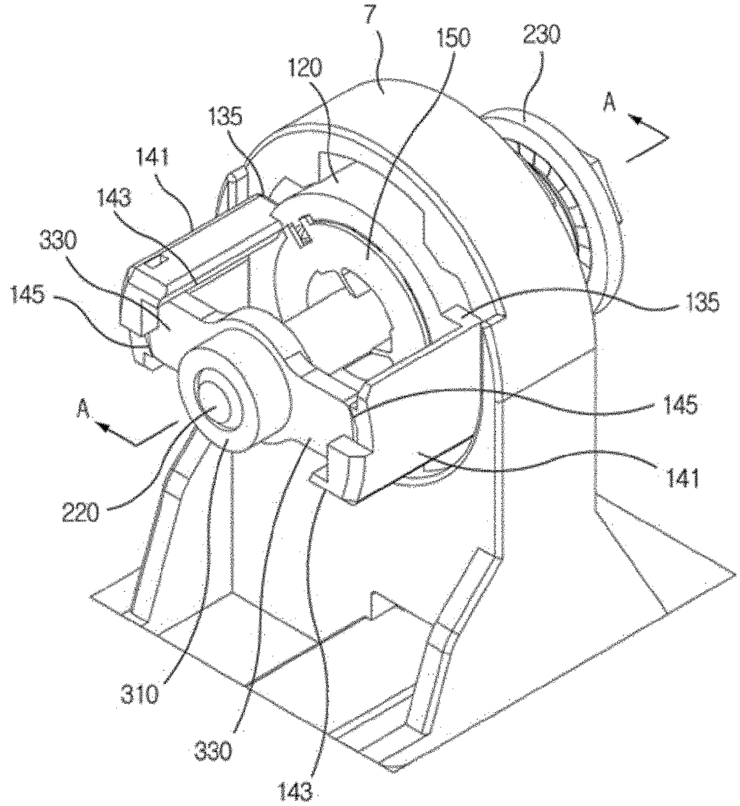
[Fig. 12]
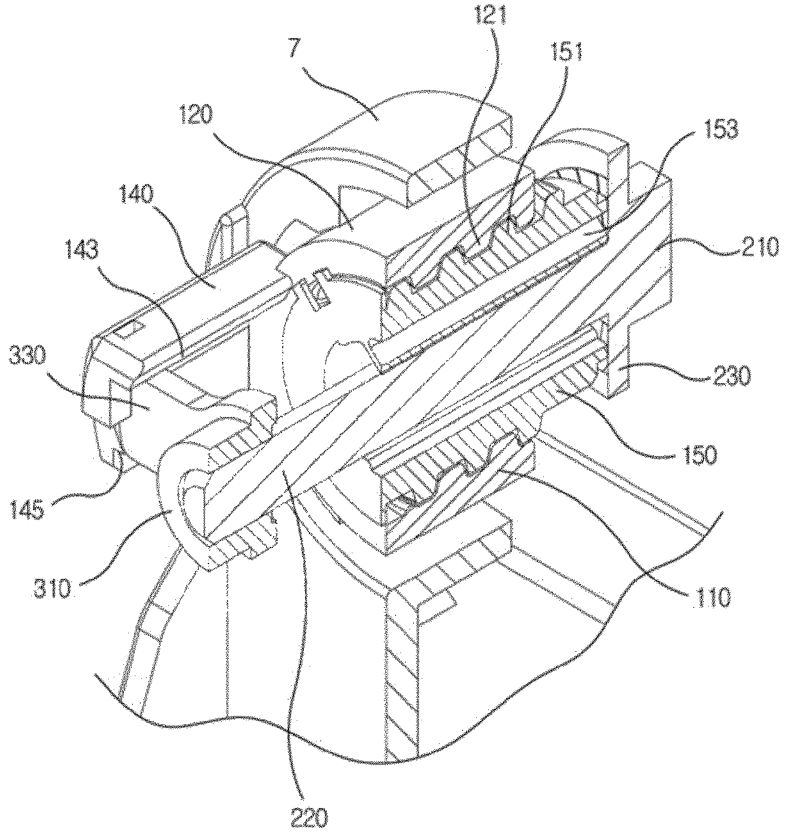

[Fig. 13]
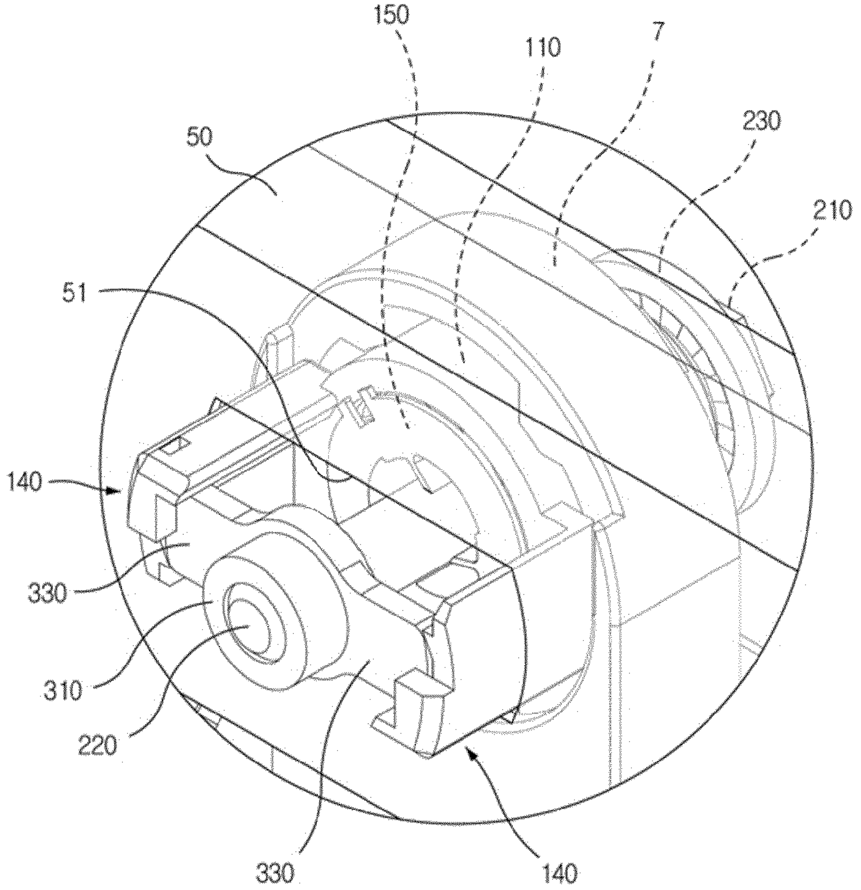

[Fig. 14]
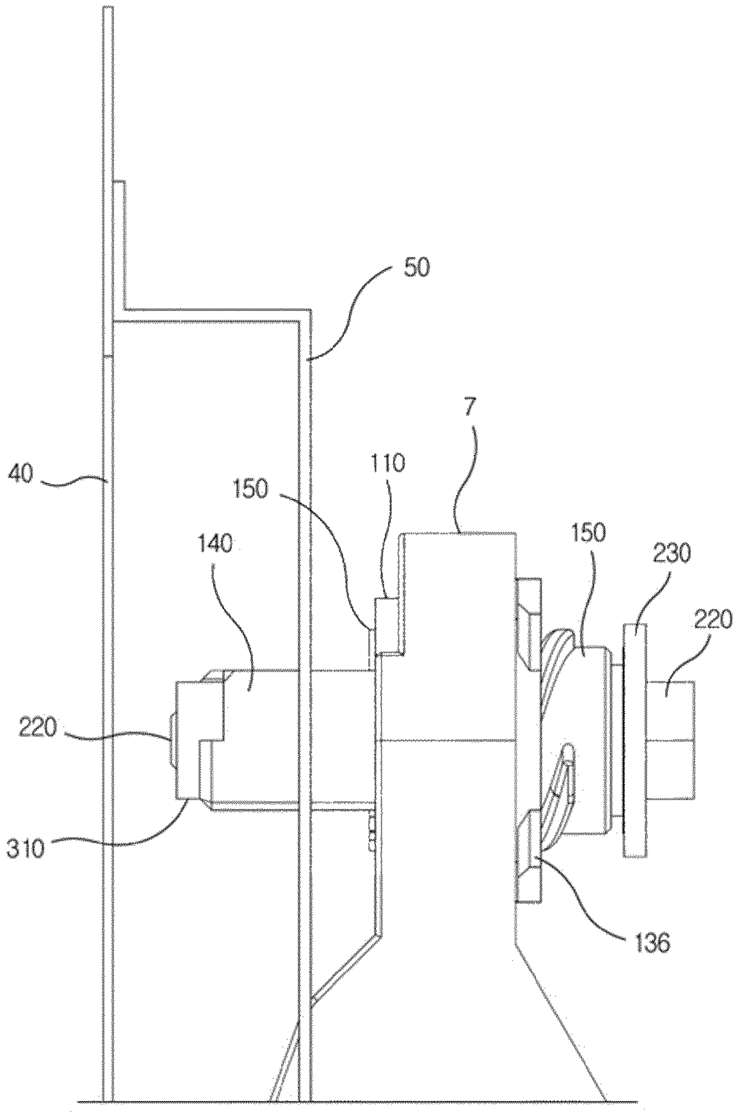

[Fig. 15]
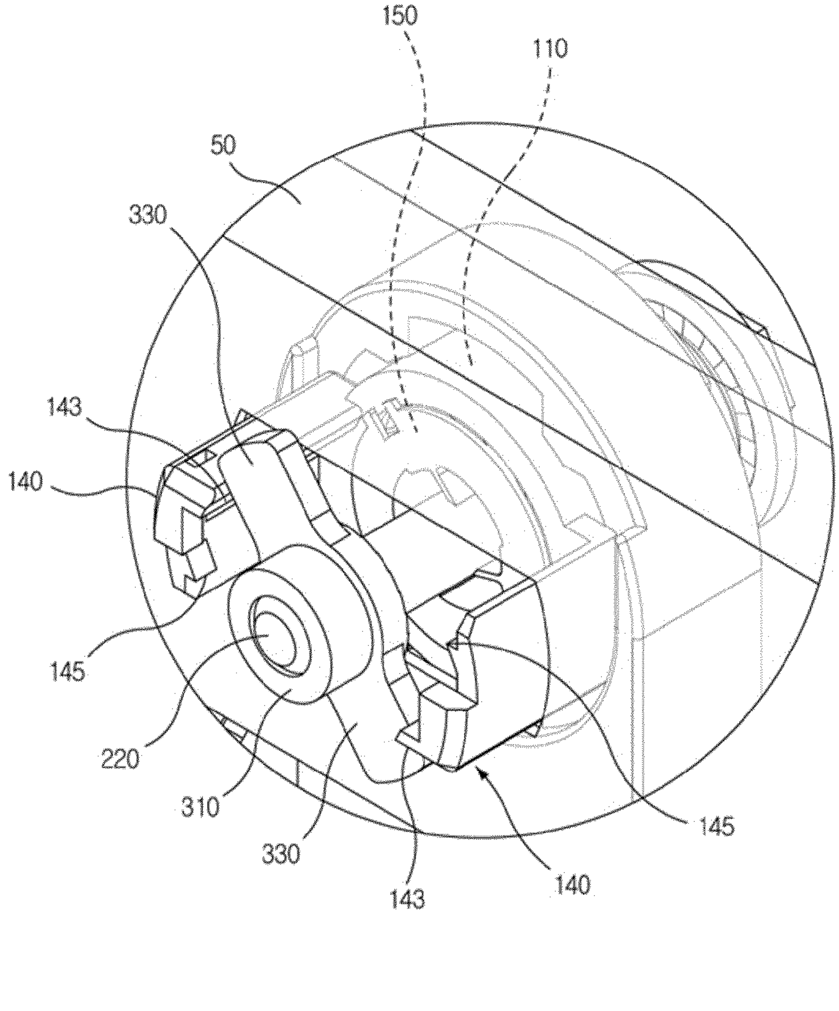

[Fig. 16]
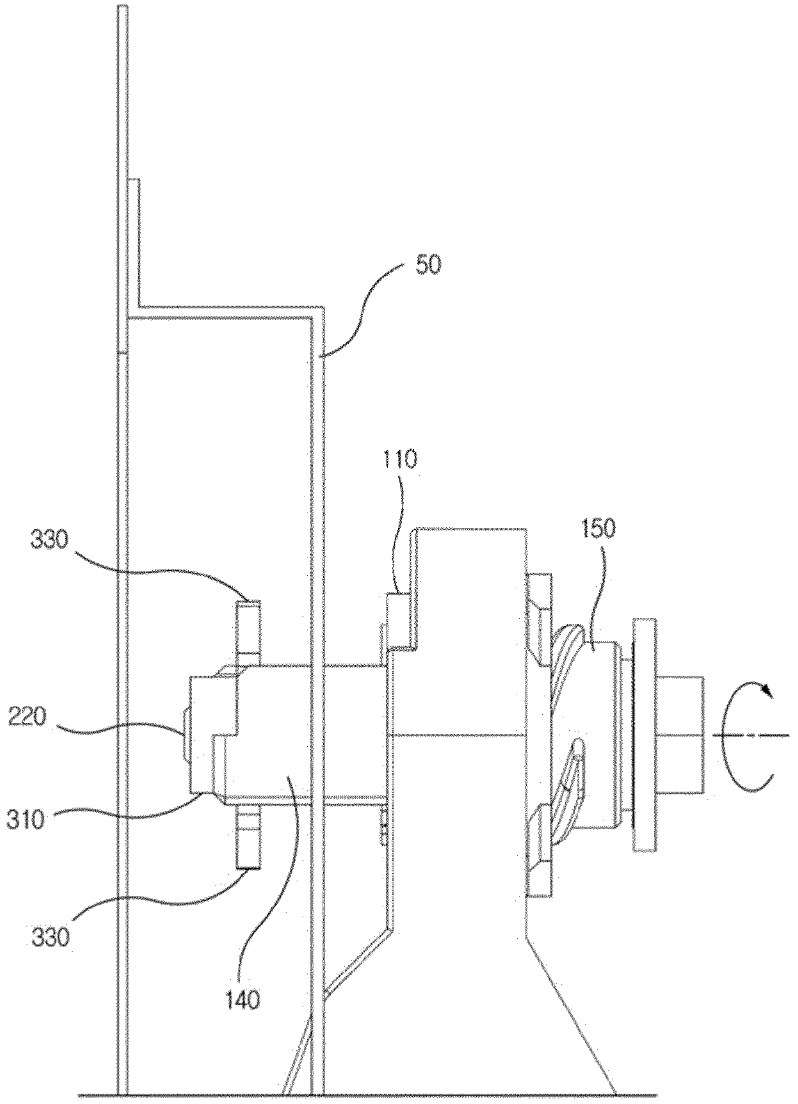

[Fig. 17]
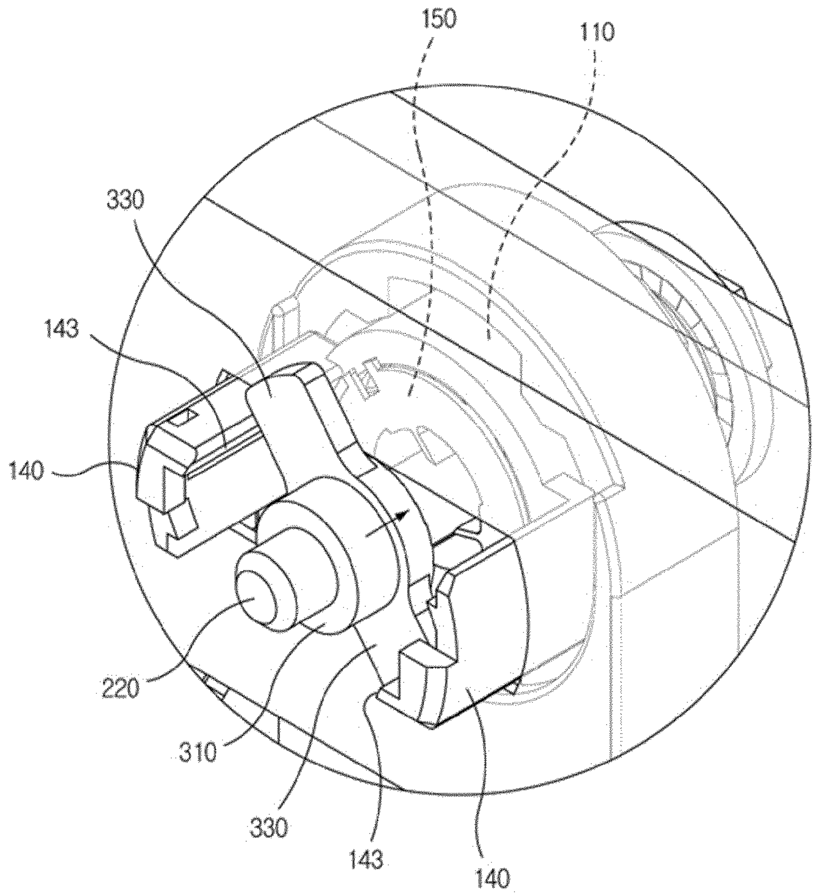

[Fig. 18]
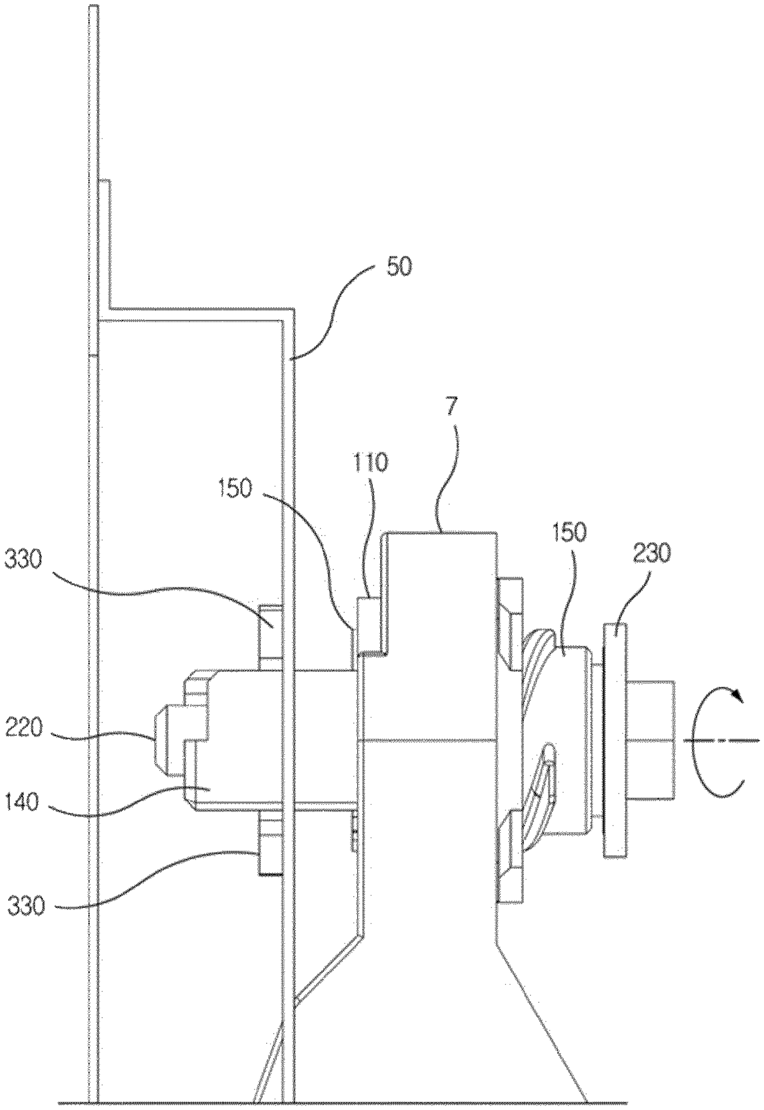

[Fig. 19]
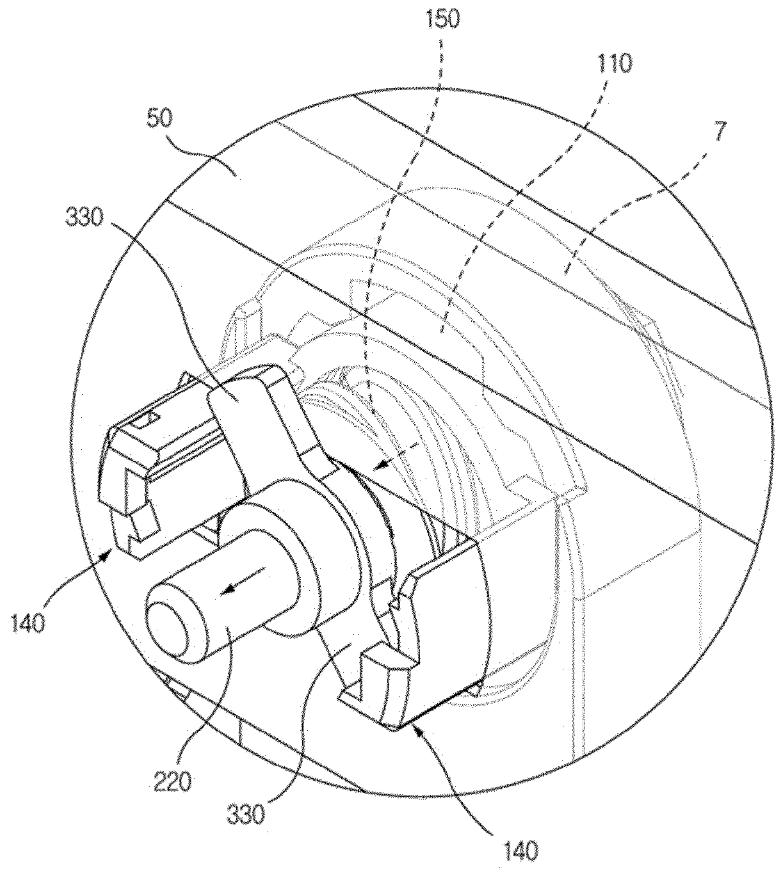

[Fig. 20]
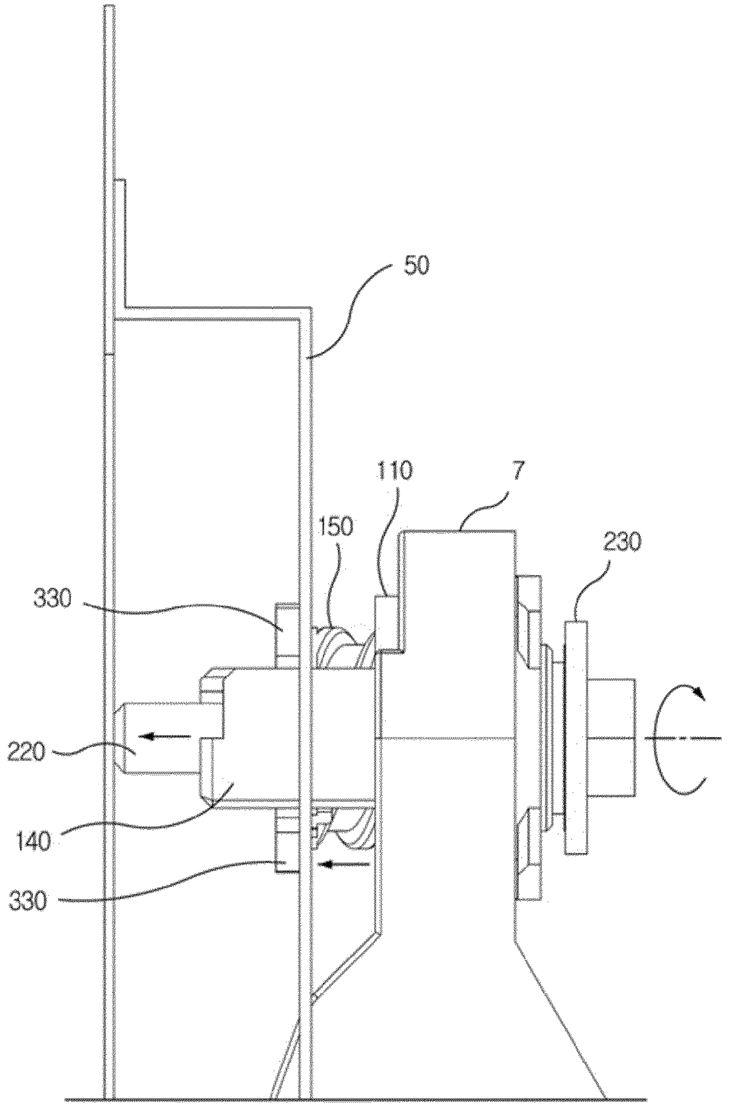

PART UNIT AND STRUCTURE FOR ASSEMBLING VEHICLE BODY

This application is the national phase entry of international patent application no. PCT/KR2023/006876 filed May 19, 2023 and claims the benefit of Korean patent application No. 10-2022-0165572 filed Dec. 1, 2022, the disclosures of which are incorporated herein by reference in their entirety.

TECHNICAL FIELD

The present disclosure relates to a part unit and a structure for assembling a vehicle body. More specifically, the present disclosure relates to a part unit and a vehicle body assembly structure in which assembly ability of a part to a vehicle body such as a curved surface is remarkably improved.

BACKGROUND ART

A conventional vehicle body assembly structure manages proper dimensional tolerances of a vehicle body and a part when assembling the part to the vehicle body.

However, in a patent document (Korean Patent No. 10-2419003), since an anti-rotation piece preventing a rotation of a nut is formed by bending at one side of a nut insertion hole of a vehicle body inner plate, a size of the hole of the vehicle body inner plate may increase. Hence, a strength of the vehicle body inner plate may be weakened.

In particular, in an embodiment of the patent document (see FIGS. 1 to 16), a separate hole from the nut insertion hole needs to be formed to bend the anti-rotation piece, and a slot communicating with the nut insertion hole is formed. Therefore, the strength of the vehicle body inner plate is inevitably weakened.

In an embodiment of the patent document (see FIGS. 1 to 16), it is comprised of 3 stages of assembly because it is first inserted into the nut insertion hole, secondly moved to the slot, and then tightened.

In addition, in another embodiment of the patent document (see FIGS. 17 to 28), since a shape of the nut is deformed when used, the nut cannot be reused once lightened.

DISCLOSURE OF INVENTION

Technical Problem

An object of the present disclosure is to address the above-described and other problems.

Another object of the present disclosure is to provide a part unit in which a fastening module with improved tolerances including a reusable nut part and a reusable bolt part is assembled to a mounting part of a part.

Another object of the present disclosure is to provide a vehicle body assembly structure with improved assembly ability and strength resistance for fastening and coupling a part unit, in which a fastening module with improved tolerances including a reusable nut part and a reusable bolt part is assembled to a mounting part of a part, to a vehicle body.

Solution to Problem

In order to achieve the above-described and other objects, in one aspect of the present disclosure, there is provided a part unit assembled to a vehicle body part, the part unit comprising a part including a plurality of mounting parts;

and a fastening module assembled to each of the plurality of mounting parts, wherein the fastening module includes a screw bushing part installed on the mounting part so that the screw bushing part is linearly movable forth and back; a bolt part fitted from a rear toward a front of the screw bushing part; and a nut part fastened to a male threaded rod of the bolt part protruding forward, wherein the screw bushing part includes a screw cover part installed on the mounting part, a screw bush screw-fastened to the screw cover part, and a rotation blocking part formed at the screw cover part and configured to block a rotation of the nut part relative to a rotation of the bolt part, wherein the nut part and the screw bush contact and tighten inner and outer surfaces of the vehicle body part by the rotation of the bolt part.

In order to achieve the above-described and other objects, in another aspect of the present disclosure, there is provided a vehicle body assembly structure comprising a part unit assembled to a vehicle body part, wherein the vehicle body part includes a vehicle body outer plate and a vehicle body inner plate having an assembly hole penetrated back and forth, wherein the part unit includes a part including a plurality of mounting parts, and a fastening module configured to fasten and couple the plurality of mounting parts to the vehicle body inner plate, wherein the fastening module includes a screw bushing part installed on the mounting part so that the screw bushing part is linearly movable forth and back; a bolt part fitted from a rear toward a front of the screw bushing part; and a nut part fastened to a male threaded rod of the bolt part protruding forward, wherein the screw bushing part includes a screw cover part installed on the mounting part, a screw bush screw-fastened to the screw cover part, and a rotation blocking part formed at the screw cover part and inserted into the assembly hole, the rotation blocking part being configured to block a rotation of the nut part relative to a rotation of the bolt part, wherein the nut part and the screw bush contact and tighten inner and outer surfaces of the vehicle body inner plate by the rotation of the bolt part.

Advantageous Effects of Invention

Effects of a part unit and a vehicle body assembly structure according to the present disclosure are described as follows.

According to at least one embodiment of the present disclosure, the present disclosure can provide a part unit for implementing a fastening module capable of reusing a nut part.

According to at least one embodiment of the present disclosure, the present disclosure can provide a part unit for improving assembly ability in which a fastening module is once assembled to a part.

According to at least one embodiment of the present disclosure, the present disclosure can provide a vehicle body assembly structure preventing a reduction in strength by minimizing assembly holes in a vehicle body.

According to at least one embodiment of the present disclosure, the present disclosure can provide a vehicle body assembly structure that expects quality improvement and cost reduction by improving the process and assembly operability of a part unit to a vehicle body.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

BRIEF DESCRIPTION OF DRAWINGS

FIGS. 1 and 2 are coupled and separated perspective views of a vehicle body assembly structure according to an embodiment of the present disclosure when viewed from the front.

FIGS. 3 and 4 are rear perspective views of FIGS. 1 and 2.

FIGS. 5 and 6 are front and rear perspective views illustrating a separation of a fastening module.

FIG. 7 is an enlarged perspective view of a screw cover part and a rotation blocking part of FIG. 5.

FIG. 8 is an enlarged perspective view of a screw bush of FIG. 5.

FIGS. 9, 10 and 11 are perspective views illustrating steps of assembling a fastening module to a mounting part of a part.

FIG. 12 is a cross-sectional perspective view taken along line A-A of FIG. 11.

FIGS. 13 and 14 are a front perspective view and a side view illustrating that a fastening module of a part is inserted into a vehicle body inner plate.

FIGS. 15 and 16 are a front perspective view and a side view illustrating that a wing piece of a nut part gets out of a seating piece due to the tightening of a bolt part and is caught on a rotation blocking part.

FIGS. 17 and 18 are a front perspective view and a side view illustrating that a nut part moving backward is caught on a vehicle body inner plate due to the continuous tightening of a bolt part.

FIGS. 19 and 20 are a front perspective view and a side view illustrating that a nut part and a screw bush are tightly tightened to inner and outer surfaces of a vehicle body inner plate by a forward movement of a bolt part and the screw bush resulting from the continuous tightening.

MODE FOR THE INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected with other layers, areas, and components intervening between them. For example, when layers, areas, components, etc. are electrically connected, the present disclosure includes both the case where layers, areas, and components are directly electrically connected, and the case where layers, areas, and components are indirectly electrically connected with other layers, areas, and components intervening between them.

Hereinafter, x axis is defined as a left-right direction, y axis is defined as an inward-outward direction or a front-rear direction, and z axis is defined as an up-down direction.

FIGS. 1 and 2 arc coupled and separated perspective views of a vehicle body assembly structure according to an embodiment of the present disclosure when viewed from the front. FIGS. 3 and 4 are rear perspective views of FIGS. 1 and 2.

Referring to FIGS. 1 to 4, a vehicle body assembly structure according to an embodiment of the present disclosure may include a part unit 1.

The part unit 1 may be assembled to a vehicle body part 30.

The part unit 1 may include a part 3. The part 3 may be a flush door from which a grip is withdrawn.

The part 3 may include a housing 5. In the housing 5, front and rear housings may be assembled. A grip 4 may be disposed on a front surface of the housing 5. An operating unit (not shown) for withdrawing the grip 4 may be mounted inside the housing 5.

The part 3 may include a mounting part 7. The mounting part 7 may be installed on upper and lower sides of the housing 5 or may be integrally formed. That is, the mounting part 7 may basically include two mounting parts on upper left and right sides of the housing 5 and one mounting part on the lower side of the housing 5, and may be added or subtracted depending on a mounting environment. Referring to FIG. 9, the mounting part 7 may have a ring shape having a front and rear through hole.

The part unit 1 may include a fastening module 10. The fastening module 10 may be assembled to the mounting part 7. The fastening module 10 may be coupled to a vehicle body.

FIGS. 5 and 6 are front and rear perspective views illustrating a separation of the fastening module 10. FIG. 7 is an enlarged perspective view of a screw cover part 110 and a rotation blocking part 140 of FIG. 5.

Referring to FIGS. 5, 6 and 7, the fastening module 10 may include a screw bushing part 100. The screw bushing part 100 may be installed on the mounting part 7 as illustrated in FIG. 11.

The screw bushing part 100 may include the screw cover part 110. The screw cover part 110 may be installed on the mounting part 7. The screw cover part 110 may be integrally injection molded. The screw cover part 110 can improve assembly ability of the fastening module 10 to the mounting part 7.

The screw cover part 110 may include a hollow cover 120. An inner screw 121 may be formed on an inner perimeter surface of the hollow cover 120.

The screw cover part 110 may be detached from the mounting part 7 by a detachable part 130. The detachable part 130 may detach the hollow cover 120 from the mounting part 7.

FIGS. 9, 10 and 11 are perspective views illustrating steps of assembling the fastening module 110 to the mounting part 7 of the part 3.

Referring to FIG. 9, the detachable part 130 may include a first detachable part 131. The first detachable part 131 may be formed at the mounting part 7.

The first detachable part 131 may include a first front engaging inner jaw 132. The first front engaging inner jaw 132 may be formed on a front surface of the mounting part 7. That is, the first front engaging inner jaws 132 may be formed to protrude toward the center on the front left and right sides of the mounting part 7.

The first detachable part 131 may include a first rear engaging inner jaw 133. The first rear engaging inner jaw 133 may be formed in a diagonal direction at a rear side of the mounting part 7. The first rear engaging inner jaws 133 may be disposed up and down on the left and right sides when viewed from the front or the rear.

The detachable part 130 may include a second detachable part 134. The second detachable part 134 may be formed on the hollow cover 120.

The second detachable part 134 may include a second front engaging outer jaw 135. The second front engaging outer jaw 135 may face the front of the hollow cover 120 and protrude outward. The second front engaging outer jaw 135 may pass between the first front engaging inner jaw 132 and the first rear engaging inner jaw 133 in the up-down direction. The second front engaging outer jaw 135 may be engaged with the first front engaging inner jaw 132.

The second detachable part 134 may include a second rear engaging outer jaw 136. The second rear engaging outer jaw 136 may be formed in a diagonal direction at a rear side of the hollow cover 120. The second rear engaging outer jaws 136 may be disposed up and down on the left and right sides of the second front engaging outer jaw 135.

The hollow cover 120 may be inserted into the mounting part 7 from the rear to the front of the mounting part 7 (see FIG. 10). When the hollow cover 120 rotates 90 degrees (see FIG. 11), the second detachable part 134 may be engaged and coupled with the first detachable part 131.

The detachable part 130 simply assembles the fastening module 10, that is a pre-prepared tolerance module, to the vehicle body part 30, and thus workability can be improved, and performance improvements, such as the quality and the cost, can be expected accordingly.

Referring to FIGS. 5, 6 and 7, the screw bushing part 100 may include the rotation blocking part 140. The rotation blocking part 140 can prevent a rotation of a nut part 300 relative to a rotation of a bolt part 200. The rotation blocking part 140 may be formed on the screw cover part 110.

The rotation blocking part 140 may include an extension bar 141 extending forward from a front surface of the screw cover part 110. The extension bar 141 may include a pair of left and right extension bars. In particular, a rear end of the extension bar 141 may be installed perpendicular to the second front engaging outer jaw 135. The extension bar 141 may include an arc bar that draws a circle.

The rotation blocking part 140 may include a rotation blocking jaw 143. The rotation blocking jaw 143 may protrude in the left-right direction with respect to the front-rear direction of the extension bar 141. Referring to FIG. 7, the left rotation blocking jaw 143 may be disposed on the upper side, and the right rotation blocking jaw 143 may be disposed on the lower side. That is, the left rotation blocking jaw 143 and the right rotation blocking jaw 143 may be disposed to diagonally face each other. Thus, the nut part 300 rotates to the side where there is no rotation blocking jaw 143, and can no longer rotate when the nut part 300 is caught on the rotation blocking jaw 143. The extension bar 141 and the rotation blocking jaw 143 may be ¬-shaped or ı -shaped when viewed from the front.

The rotation blocking part 140 may include a seating piece 145. The seating piece 145 may be formed at the front inside of the extension bar 141. The seating piece 145 may be disposed to face the rotation blocking jaw 143. Thus, a wing piece 330 may be seated between the rotation blocking jaw 143 and the seating piece 145. The seating piece 145 may have an inclined surface 146 that follows a tightening rotation direction of the wing piece 330. The inclined surface 146 may support a portion of a perimeter of an end of the wing piece 330. Thus, the wing piece 330 is stopped in place as illustrated in FIG. 11 and can be directly inserted without being caught in an assembly hole 51 of a vehicle body inner plate 50. When the wing piece 330 rotates, the wing piece 330 can easily get out while sliding the inclined surface 146.

FIG. 8 is an enlarged perspective view of a screw bush 150 of FIG. 5.

Referring to FIGS. 5, 6 and 8, the screw bushing part 100 may include the screw bush 150. An outer screw 151 may be formed on an outer perimeter surface of the screw bush 150. The screw bush 150 may be injection molded. The outer screw 151 of the screw bush 150 may be fastened to the inner screw 121 of the hollow cover 120. As the screw bush 150 rotates, the screw bush 150 may linearly move in an axial direction with respect to the hollow cover 120. The inner screw 121 of the hollow cover 120 and the outer screw 151 of the screw bush 150 have a large grid angle, and thus can freely move linearly. The screw bush 150 may be fastened and inserted from the front to the rear of the hollow cover 120.

Referring to FIGS. 8 and 12, the screw bush 150 may include an inclined plate 153. The inclined plate 153 may be formed on an inner wall of the screw bush 150. The inclined plate 153 may be arranged at intervals of 120 degrees. As illustrated in FIG. 6, when a male threaded rod 220 of the bolt part 200 is inserted into a space formed at ends of the three inclined plates 153, the three inclined plates 153 can hold the bolt part 200 to improve a clearance of the bolt part 200, and can allow the movement of the male threaded rod 220 in a direction of lifting the inclined plates 153 (xz direction) to remarkably increase tightening efficiency.

Further, a hook 154 may be formed at a front end of the inclined plate 153. The hook 154 may be caught on a thread of the male threaded rod 220 of the bolt part 200 to prevent the bolt part 200 from being pushed rearward. The hook 154 fixes a position of the male threaded rod 220 and thus can always maintain an initial use position during product assembly and transportation and prevent the bolt from being separated.

The three inclined plates 153 can provide a flexible structure capable of preventing the bolt part 200 from being pushed rearward, maintaining the central origin between the screw bush 150 and the bolt part 200 (securing an XZ reference point convenient for tool use), preventing a flow between the screw bush 150 and the bolt part 200 (improving noise factors such as a hitting sound), and collecting a tolerance by adjusting the XZ direction.

Referring to FIGS. 5 and 6, the fastening module 10 may include the bolt part 200. The bolt part 200 may be inserted from the rear toward the front of the screw bush 150.

The bolt part 200 may include a bolt with washer 200. The bolt with washer 200 may include a hexagonal head 210, a male threaded rod 220, and a head washer 230 formed on the head 210. The head 210 may be a tool application portion, the male threaded rod 220 may be a fastening portion of the nut part 300, and the head washer 230 may be a pressurizing portion of a rear end surface of the screw bush 150.

Referring to FIGS. 5 and 6, the fastening module 10 may include the nut part 300. The nut part 300 may include a nut 310. Referring to FIGS. 9 to 11, the nut 310 may be fastened to the male threaded rod 220 protruding forward from a front surface of the screw bush 150.

The nut part 300 may include the wing piece 330. The wing piece 330 may extend left and right from an outer perimeter surface of the nut 310.

Accordingly, when the nut part 300 rotates the bolt part 200 after the nut part 300 is inserted from the inside to the outside of the vehicle body part 30 and passes through the vehicle body part 30, the nut part 300 may contact and tighten inner and outer surfaces of the vehicle body part 30 by moving forward the screw bush 150 after the wing piece 330 moves rearward.

The vehicle body assembly structure according to an embodiment of the present disclosure may include the vehicle body part 30.

Referring to FIGS. 1 to 4, the vehicle body part 30 may include a vehicle body outer plate 40. The vehicle body outer plate 40 may be an outer plate having a curved surface. The vehicle body outer plate 40 may include a grip withdrawal hole 44. The grip 4 may be disposed in the grip withdrawal hole 44.

The vehicle body part 30 may include the vehicle body inner plate 50. The vehicle body inner plate 50 may be installed to be spaced apart from the vehicle body outer plate 40.

As illustrated in FIG. 4, the vehicle body inner plate 50 may include the assembly hole 51. The assembly hole 51 may be a quadrangular hole penetrated back and forth. The assembly hole 51 may have a size enough to pass through the rotation blocking part 140.

The vehicle body inner plate 50 may include a part insertion hole 53. As illustrated in FIG. 3, the front surface of the housing 5 of the part 3 may be inserted into the part insertion hole 53. In this instance, the fastening module 10 may be disposed inside the vehicle body inner plate 50 to face the assembly hole 51.

FIGS. 13 to 20 illustrate steps of assembling the part 3 of FIG. 2 to the vehicle body part 30.

FIGS. 13 and 14 are a perspective view and a side view illustrating after the rotation blocking part 140 of the fastening module 10 is inserted into the assembly hole 51 of the vehicle body inner plate 50.

When the rotation blocking part 140 is inserted into the assembly hole 51 as illustrated in FIGS. 13 and 14, the wing piece 330 of the nut part 300 gets out of the seating piece 145 when the bolt part 200 rotates in a tightening direction as illustrated in FIGS. 15 and 16, and the wing piece 330 rotates until the wing piece 330 is caught on the rotation blocking jaw 143.

As illustrated in FIGS. 15 and 16, the wing piece 330 caught on the rotation blocking jaw 143 no longer rotates, and the nut 310 moves backward along the male threaded rod 220 by the rotating bolt part 200. Hence, as illustrated in FIGS. 17 and 18, the nut 310 moves to the outer surface of the vehicle body inner plate 50 and then is caught.

As illustrated in FIGS. 19 and 20, the bolt part 200 rotating with respect to the non-moving nut 310 moves forward while rotating together with the screw bush 150, and moves to the inner surface of the vehicle body inner plate 50 and then is caught.

As illustrated in FIGS. 19 and 20, when the wing piece 330 and the screw bush 150 rotate the bolt part 200 even after being caught on the inner and outer surfaces of the vehicle body inner plate 50, the wing piece 330 and the screw bush 150 can be prevented from loosening due to serration protrusions of the nut 310 and the bolt part 200 and can be tightened in closer contact with the inner and outer surfaces of the vehicle body inner plate 50.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

DESCRIPTION OF REFERENCE NUMERALS

1: part unit 3: part (flush handle)
4: grip 5: housing
7: mounting part 10: fastening module
7: vehicle body part 40: vehicle body outer plate
44: grip withdrawal hole 50: vehicle body inner plate
51: assembly hole 53: part insertion hole
100: screw bushing part 110: screw cover part
120: hollow cover 130: detachable part
131, 134: first and second detachable parts
132, 133: first front and rear engaging inner jaws

135, 136: second front and rear engaging outer jaws
150: screw bush 200: bolt part
220: male threaded rod 230: head washer
300: nut part 310: nut
330: wing piece

What is claimed is:

1. A part unit assembled to a vehicle body part, the part unit comprising:
a part including a plurality of mounting parts; and
a fastening module assembled to each of the plurality of mounting parts,
wherein the fastening module includes:
a screw bushing part installed on the mounting part so that the screw bushing part is linearly movable forth and back;
a bolt part fitted from a rear toward a front of the screw bushing part; and
a nut part fastened to a male threaded rod of the bolt part protruding forward,
wherein the screw bushing part includes:
a screw cover part installed on the mounting part;
a screw bush screw-fastened to the screw cover part; and
a rotation blocking part formed at the screw cover part and configured to block a rotation of the nut part relative to a rotation of the bolt part,
wherein the nut part and the screw bush contact and tighten inner and outer surfaces of the vehicle body part by the rotation of the bolt part.

2. The part unit of claim 1, wherein the nut part includes:
a nut fastened to the male threaded rod; and
a wing piece formed on an outer perimeter surface of the nut,
wherein the wing piece is contact with the outer surface of the vehicle body part while being caught on the rotation blocking part.

3. The part unit of claim 2, wherein the rotation blocking part includes:
an extension bar extending forward from a front surface of the screw cover part; and
a rotation blocking jaw protruding in a left-right direction with respect to a front-rear direction of the extension bar,
wherein the wing piece is caught on the rotation blocking jaw, and the rotation blocking jaw blocks a rotation.

4. The part unit of claim 3, wherein a seating piece is formed on the extension bar, and
wherein the wing piece is seated between the rotation blocking jaw and the seating piece.

5. The part unit of claim 4, wherein the seating piece includes an inclined surface that follows a tightening rotation direction of the wing piece, and
wherein the inclined surface support a portion of a perimeter of an end of the wing piece.

6. The part unit of claim 1, wherein the screw cover part includes:
a hollow cover in which a screw is formed on an inner perimeter surface of the hollow cover; and
a detachable part detaching the hollow cover from the mounting part.

7. The part unit of claim 6, wherein the detachable part includes:
a first detachable part formed on the mounting part; and
a second detachable part formed on the hollow cover,
wherein when the hollow cover is inserted into the mounting part and rotates, the second detachable part is detached from the first detachable part.

8. The part unit of claim 7, wherein the first detachable part includes:
a first front engaging inner jaw formed on each of front left and right sides of the mounting part; and
a first rear engaging inner jaw formed diagonally at a rear of the mounting part,
wherein the second detachable part includes:
a second front engaging outer jaw formed on each of front left and right sides of the hollow cover; and
a second rear engaging outer jaw formed diagonally at a rear of the hollow cover,
wherein the second front engaging outer jaw is engaged with the first front engaging inner jaw, and
wherein the second rear engaging outer jaw is engaged with the first rear engaging inner jaw.

9. The part unit of claim 8, wherein the rotation blocking part is formed at the second front engaging outer jaw.

10. The part unit of claim 1, wherein an inclined plate is formed on an inner wall of the screw bush at intervals of 120 degrees,
wherein a hook is formed at a front end of the inclined plate, and
wherein the hook is caught on a thread of the bolt part to prevent a rear movement.

11. A vehicle body assembly structure in which a part unit is assembled to a vehicle body part,
wherein the vehicle body part includes a vehicle body outer plate and a vehicle body inner plate having an assembly hole penetrated back and forth,
wherein the part unit includes:
a part including a plurality of mounting parts; and
a fastening module configured to fasten and couple the plurality of mounting parts to the vehicle body inner plate,
wherein the fastening module includes:
a screw bushing part installed on the mounting part so that the screw bushing part is linearly movable forth and back;
a bolt part fitted from a rear toward a front of the screw bushing part; and
a nut part fastened to a male threaded rod of the bolt part protruding forward,
wherein the screw bushing part includes:
a screw cover part installed on the mounting part;
a screw bush screw-fastened to the screw cover part; and
a rotation blocking part formed at the screw cover part and inserted into the assembly hole, the rotation blocking part being configured to block a rotation of the nut part relative to a rotation of the bolt part,
wherein the nut part and the screw bush contact and tighten inner and outer surfaces of the vehicle body inner plate by the rotation of the bolt part.

12. The vehicle body assembly structure of claim 11, wherein the nut part includes:
a nut fastened to the male threaded rod; and
a wing piece formed on an outer perimeter surface of the nut,
wherein the wing piece is contact with an outer surface of the vehicle body part while being caught on the rotation blocking part.

13. The vehicle body assembly structure of claim 12, wherein the rotation blocking part includes:
an extension bar extending forward from a front surface of the screw cover part; and
a rotation blocking jaw protruding in a left-right direction with respect to a front-rear direction of the extension bar, wherein the wing piece is caught on the rotation blocking jaw, and the rotation blocking jaw blocks a rotation.

14. The vehicle body assembly structure of claim 13, wherein a seating piece is formed on the extension bar, and wherein the wing piece is seated between the rotation blocking jaw and the seating piece.

15. The vehicle body assembly structure of claim 14, wherein the seating piece includes an inclined surface that follows a tightening rotation direction of the wing piece, and wherein the inclined surface support a portion of a perimeter of an end of the wing piece.

16. The vehicle body assembly structure of claim 11, wherein the screw cover part includes:

a hollow cover in which a screw is formed on an inner perimeter surface of the hollow cover; and a detachable part detaching the hollow cover from the mounting part.

17. The vehicle body assembly structure of claim 16, wherein the detachable part includes:

a first detachable part formed on the mounting part; and a second detachable part formed on the hollow cover, wherein when the hollow cover is inserted into the mounting part and rotates, the second detachable part is detached from the first detachable part.

18. The vehicle body assembly structure of claim 17, wherein the first detachable part includes:

a first front engaging inner jaw formed on each of front left and right sides of the mounting part; and a first rear engaging inner jaw formed diagonally at a rear of the mounting part, wherein the second detachable part includes:

a second front engaging outer jaw formed on each of front left and right sides of the hollow cover; and a second rear engaging outer jaw formed diagonally at a rear of the hollow cover, wherein the second front engaging outer jaw is engaged with the first front engaging inner jaw, and wherein the second rear engaging outer jaw is engaged with the first rear engaging inner jaw.

19. The vehicle body assembly structure of claim 18, wherein the rotation blocking part is formed at the second front engaging outer jaw.

20. The vehicle body assembly structure of claim 11, wherein an inclined plate is formed on an inner wall of the screw bush at intervals of 120 degrees, wherein a hook is formed at a front end of the inclined plate, and wherein the hook is caught on a thread of the bolt part to prevent a rear movement.

* * * * *